Dec. 7, 1937.    T. L. FAWICK    2,101,134
TRANSMISSION
Filed April 11, 1935    7 Sheets-Sheet 5

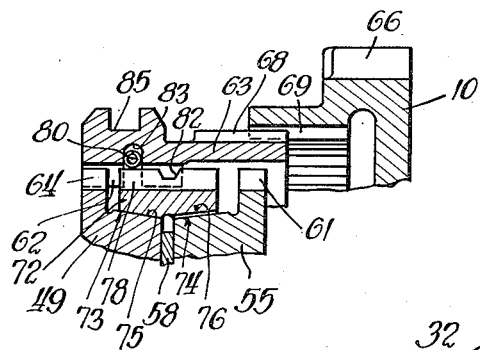
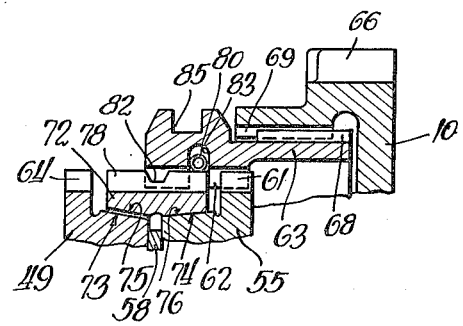
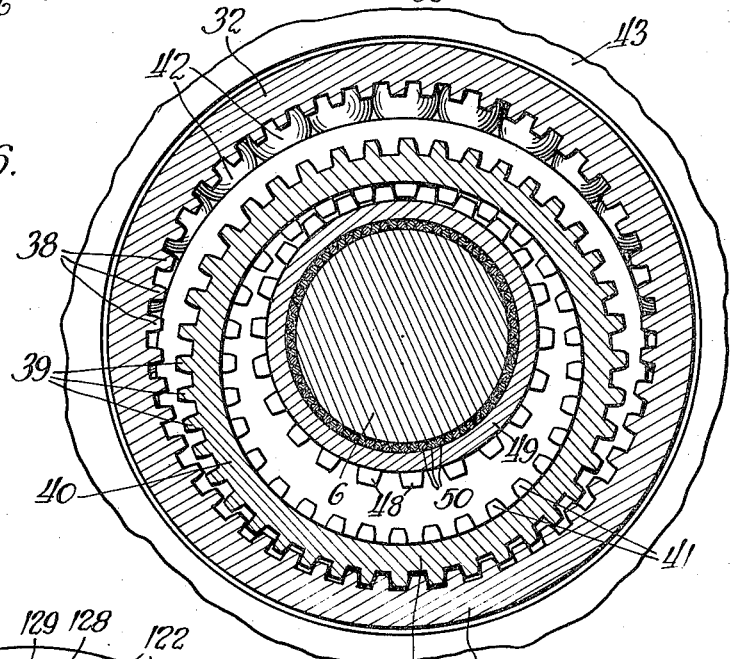
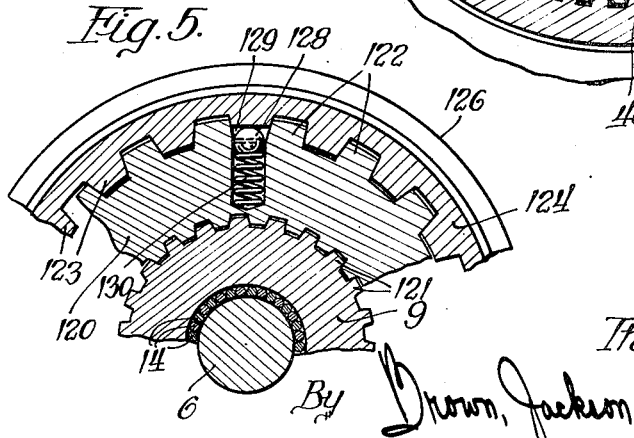

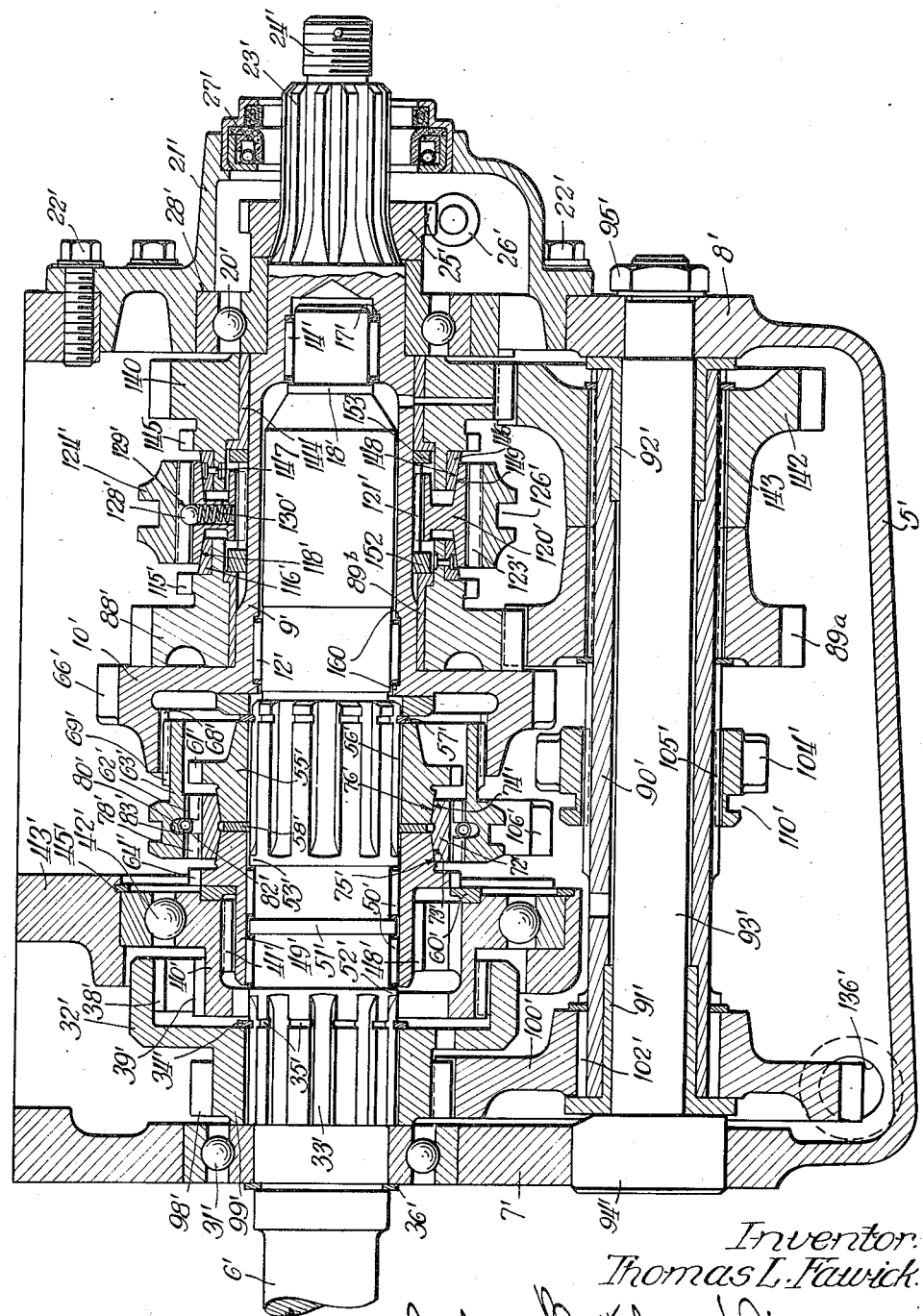

Inventor:
Thomas L. Fawick
By Brown, Jackson, Boettcher + Dienner
Attys.

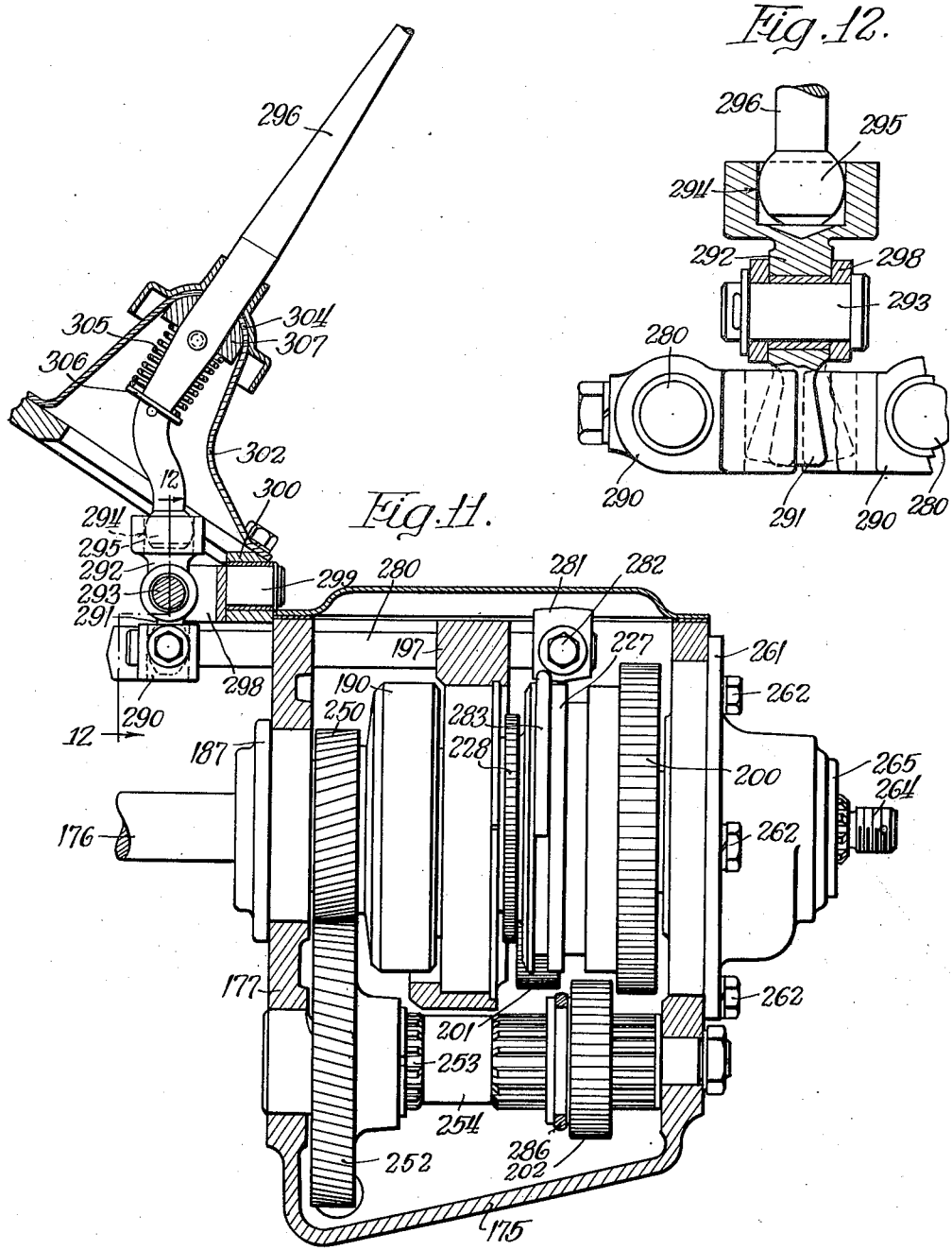

Dec. 7, 1937.  T. L. FAWICK  2,101,134
TRANSMISSION
Filed April 11, 1935  7 Sheets-Sheet 7
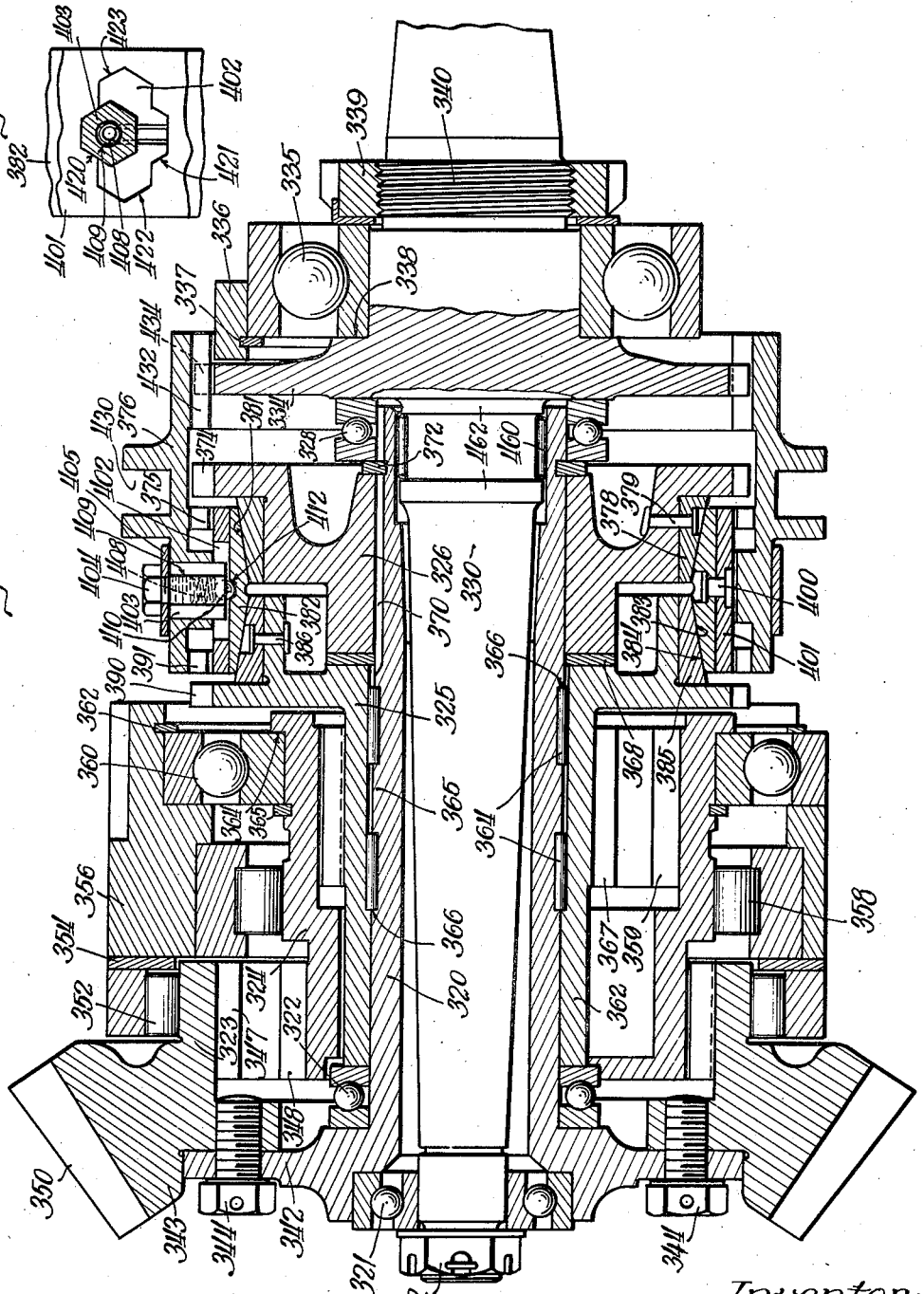

Patented Dec. 7, 1937

2,101,134

UNITED STATES PATENT OFFICE 2,101,134

TRANSMISSION

Thomas L. Fawick, Akron, Ohio, assignor to Borg-Warner Corporation, Chicago, Ill., a corporation of Illinois Application April 11, 1935, Serial No. 15,764

14 Claims. (Cl. 74—332)

My inventionn relates to transmissions for automotive apparatus.

While the particular devices which I shall described hereinafter in connection with the drawings are transmissions adapted for use in automobiles, motor busses, trucks and the like, it is to be understood that the invention is not limited to such uses but may be employed in all similar work, for example, locomotives and the like, and elsewhere as suitable or desired.

In transmitting the drive from a gasoline engine to the rear wheels or other driving wheels, it has become desirable to provide overdrive gear means.

So far, there have been two general schemes for securing the desired overdrive—first, by means of an overdrive gear device at the rear axle, and second, by means of an overdrive device at the accelerating and reverse gear transmission between the engine shaft and the propeller shaft.

The first scheme above mentioned has the objection of putting additional weight on the rear axle or connected parts. This results in high unsprung weight and is not desirable. The disadvantages of unsprung weight are so well known to engineers skilled in this art that no recapitulation of the same is necessary.

Furthermore, in all types of overdrive devices using conventional gearing, the overdrive is obtained entirely through tooth roll. That is, if they obtained, say, 100% direct drive on the third speed, then when shifted to the fourth speed, which we will say is geared up 30%, they would have all or 130% tooth roll. In fact, the tooth roll in such a device would be the same principle as in driving in second gear in the conventional three-speed transmission. This great tooth roll makes it commercially impossible to obtain a quiet gear ratio in overdrive and, as a result, devices of this sort are noisy, with considerable wear.

My invention relates to the second class of overdrive devices; namely, to the class of devices in which the overdrive gearing is at the gear box for the accelerating and reverse gearing, or between the engine shaft and the propeller shaft where the weight is sprung weight and, consequently, least objectionable.

According to my invention, I provide an accelerating and reverse gear transmission embodying, as a part thereof and without an auxiliary overdrive device and an auxiliary casing therefor, an overdrive device consisting of an internal gear driven by the driving shaft extending from the clutch, or by any other suitable driving member, and a cooperating external gear member for transmitting the overdrive to the propeller shaft. The external gear member is preferably a part of a combination external internal or composite gear, the internal gear of which meshes with an external gear on a driven member for connection with the driven shaft of the transmission, which driven shaft, in turn, is adapted for connection with the propeller shaft of the vehicle. This gives a compound overdrive ratio in the overdrive position, but this compound character of the device may, of course, be omitted or varied within the scope of the present invention.

For every mile traveled through the internal gear overdrive, I obtain exactly the same amount of direct drive in one ratio as the other. For example, calling the direct drive 100% and having 30% overdrive in the internal gearing, the only tooth roll developed is the 30% over the direct drive. Therefore, for each mile traveled in the overdrive, the direct drive portion is exactly the same as the regular direct or third speed. This low tooth roll of the internal gear drive makes it possible to obtain an absolutely quiet gear ratio so that there is no more sound in the overdrive ratio than in direct drive. The strength of the drive is increased, and considerably more teeth are in meshing engagement at all times than with two meshing spur gears.

The lower engine speed makes the engine exceptionally quiet, and it operates with a great deal more efficiency and with a smaller amount of motor oil. By the use of this quiet operating internal gear overdrive, it has been proven in actual tests that as much as 20% more mileage has been obtained per gallon of fuel than in direct drive. Outside of the saving in fuel and motor oil, one of the main objects is to provide the reduced engine speed which results in exceptionally smooth motor car operation.

The present invention may be characterized as an improvement upon the transmission illustrated and described in my prior patent, Reissue No. 18,629, dated October 18, 1932. It employs the type of internal gearing shown and described in that patent as the overdrive device.

The unusual arrangement and mounting of the overdrive and accelerating gears and bearings of the present transmissions make it possible to build a three, four, five, or other plural speed transmission which is compact and short in length, light in weight and inexpensive to manufacture, with parts of small diameter and light weight employed throughout. The compact character and short length of the present transmissions, in addition to reducing the space required for a combination accelerating, reverse and overdrive transmission, make for greater rigidity and quieter operation. Each of the transmissions of the present invention is easy to operate, and each preferably has synchro-mesh means for direct and overdrive.

According to one embodiment of the invention, it is possible to build a three-speed transmission with overdrive in approximately the same length as is now used for the conventional three-speed transmissions without overdrive and, in some cases, considerably shorter. This embodiment also has synchro-mesh means for second speed as well as for direct and overdrive, and another embodiment has synchro-mesh means for second and third speeds as well as for direct and overdrive.

For the purpose of compactness and reduced overall length, the driving shaft is preferably extended through the internal overdrive gear and through the cooperating external internal gear and reaches over adjacent a direct drive driven member which is disposed in proximity to a clutch part on the external internal gear and a splined driving connection with the driven shaft of the transmission and adjacent a synchronizing and clutching member for connecting the external internal gear or the direct drive driven member to the driven shaft of the transmission selectively, as desired.

In certain embodiments of the invention the driving shaft extends from the flywheel clutch bearing through the front wall of the transmission case and into proximity to the rear wall of the transmission case, and the driven shaft of the transmission has a tubular portion telescoping the rear end of the driving shaft and connected to the low ratio gear. This gives great compactness, and particularly short over-all length. It is to be understood that this telescoping arrangement may be reversed, i. e. the driven shaft may extend into proximity to the front wall of the transmission case and the drive shaft may telescope the driven shaft which may be piloted in the drive shaft.

Another embodiment of the invention is similar to the invention illustrated and described in my copending application Serial No. 10,769, filed March 13, 1935, except that it has a low ratio and reverse along with the direct drive and overdrive.

According to the present invention, the low ratio gear and the second ratio gear, or where there is no second ratio gear, the low ratio gear alone, or where there are low, second and third ratio gears, these gears are all fixed endwise on the main shaft instead of being slidable, thereby further lessening the space requirements for these gears.

Another feature resides in mounting the gear for second gear ratio rotatably on the tubular portion of the drive shaft, and when there are one or more gears for other gear ratios, mounting these gears also rotatably on the tubular portion of the driven shaft preferably with positive and synchronizing clutch means for connecting these gears selectively to the driven shaft.

Another feature resides in the provision of a low ratio gear having gear teeth and splines which have permanent and slidable driving engagement with the splines of the synchronizing and clutching ring for direct drive and overdrive, and more specifically, a low ratio gear with internal splines and a synchronizing and clutching ring with external splines for permanent sliding driving engagement therewith.

Another feature resides in the provision of a driven member having a tubular portion with an internal bearing, an adjacent external bearing, and another bearing directly within the low ratio gear.

Another feature resides in the provision of a low ratio gear having splined driving connection with the synchronizing and clutching ring, and a tubular portion and a second ratio gear rotatably mounted on the tubular portion of the low ratio gear on the side opposite the side having splined driving connection with the synchronizing and clutching ring.

Another feature resides in the provision of a splined shaft extending through the end of the casing, said shaft being directly connected to the low ratio gear and carrying the second ratio gear.

Another feature resides in the provision of an internal gear having integral therewith external teeth for permanent driving engagement with a gear on the countershaft of the transmission.

Another feature resides in the provision of an improved mounting for the internal gear in conjunction with an improved bearing arrangement providing admirable support for the parts and in which quietness of operation and a perfect pitch line circle are obtained.

Another feature resides in the provision of a design which lends itself to a very strong and rigid main shaft which holds the parts on their proper pitch lines under heavy loads.

Another feature resides in the provision of a clutch and transmission shaft in one piece with a bearing support at one end of the case and a bearing support at the opposite end of the case within another bearing, and more specifically in the provision with this feature of a driven shaft having a tubular portion telescoping the main driving shaft and having bearing support approximately intermediate the ends of the main shaft and in proximity to the low ratio gear.

Another feature resides in synchronizing and clutching means comprising a synchronizing member splined to the tubular portion of the driven shaft, with the main driving shaft within it, and a positive clutching member having splines permanently and slidably engaged with splines on the synchronizing member, the positive clutching member being yieldingly connected to the synchronizing member to move same therewith for synchronizing purposes, and to move relative the synchronizing member for positive clutching purposes.

Another feature resides in the provision of an improved garter spring arrangement for the synchronizing clutch.

Another feature resides in the provision of a one-piece double-cone part with an hexagonally or other suitably perforated outer ring riveted thereto, and a clutch ring fixed for limited rotative movement and axially slidable on the outer ring for engagement with the direct and overdrive clutches.

Another feature resides in the provision of a hexagonal or other suitably shaped stud having a spring and ball inside the same, the spring pressing the ball into a groove in the cone part for yieldingly connecting the cone part to the outer ring. When shifted, the ball falls into the groove and engages the cone part and the stud slides into one of two opposite positions according to the direction of movement. The synchronizing pressure is then accomplished by the angle of engagement between the face of the stud and the cooperating face of the perforation in the outer ring, and when the parts are synchronized, the stud slides off the engaging face of the perforation and the positive clutches engage.

It is to be understood that the invention is not limited to the particular combinations of ratio gear drives shown in the drawings.

Further features and advantages of the invention will be apparent from the following detailed description, taken in connection with the accompanying drawings, in which:

Figure 3 is a fragmentary detail section showing the synchronizing and clutching means for direct drive and overdrive in overdrive position;

Figure 4 is a view similar to Figure 3, showing the synchronizing and clutching means for direct drive and overdrive in direct drive position;

Figure 5 is a fragmentary detail section taken on the line 5—5 of Figure 1;

Figure 6 is a section taken on the line 6—6 of Figure 1;

Figures 7 and 8 are detail sections showing the initial and final cross section of the spring wire forming the synchronizing garter spring employed in the embodiment of the invention illustrated in Figures 1 to 6;

Figure 9 is a longitudinal sectional view of another form of transmission embodying the present invention;

Figure 11 is a view of the transmission illustrated in Figure 10, partially in section and partially in elevation and showing shifter mechanism suitable for use with the transmission;

Figure 12 is a detail section partially in elevation and taken on the line 12—12 of Figure 11;

Figure 1:
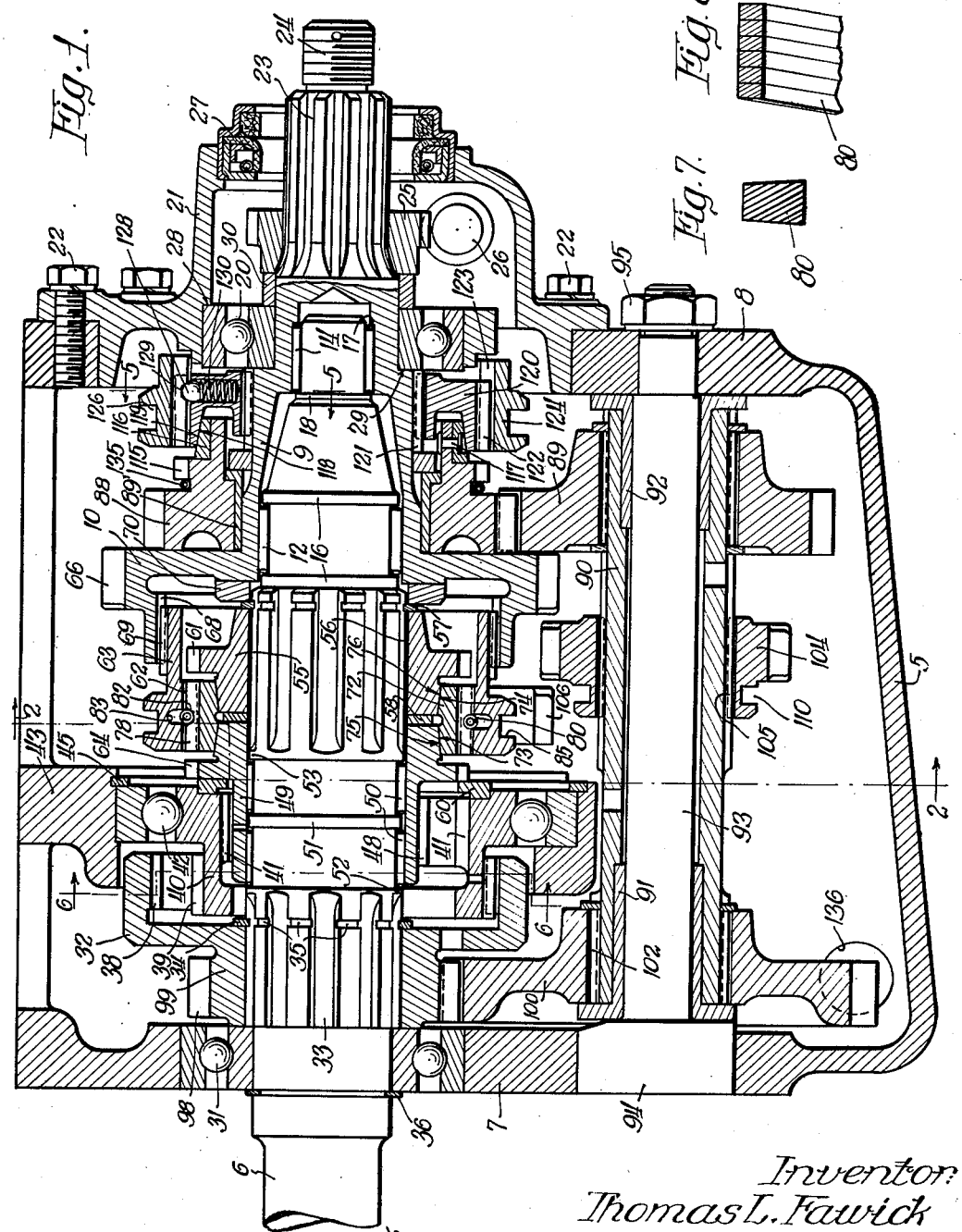
Figure 1 is a longitudinal sectional view of a transmission embodying the present invention.
Figure 2:
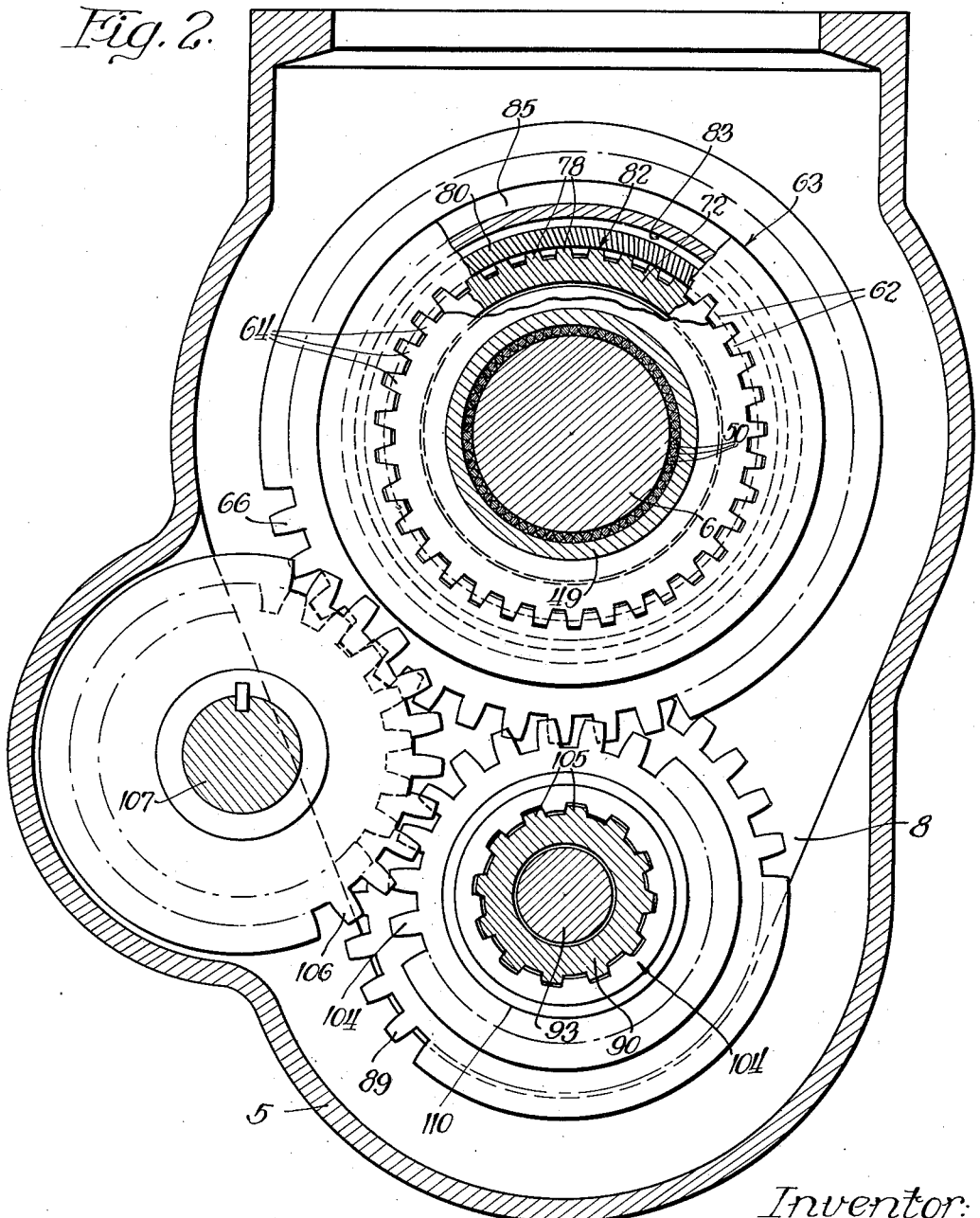
Figure 2 is a transverse section taken on the line 2—2 of Figure 1.

Figure 13 is a longitudinal sectional view of another form of transmission embodying the present invention; and Figure 14 is a fragmentary detail view showing the hexagonally or other suitably perforated outer ring riveted to the synchronizing cone part for direct drive and overdrive as shown in Figure 13, and showing the hexagonally or other suitably shaped stud which engages in the perforation in said outer ring.

Referring first to Figures 1 to 6, inclusive, the transmission is housed within a case 5 which is preferably mounted upon the vehicle frame, which frame is, in turn, preferably spring-supported upon the rear axle as, for example, in the manner illustrated in my copending application hereinbefore identified.

The shaft 6 is the driving shaft extending from the fly-wheel clutch bearing through the front wall 7 of the case 5 and into proximity to the rear wall 8 of the case. The driven shaft 9 is in the form of a forging having a tubular portion telescoping the rear end of the shaft 6 and provided with an integral or directly connected low ratio gear 10. The driving shaft 6 is supported internally of the shaft 9 and directly under the low ratio gear 10 in a bearing 12, and rearwardly of this bearing the rearward end of the shaft 6 is reduced and supported internally of the shaft 9 in a bearing 14.

The bearings 12 and 14 are preferably needle-point bearings, each comprising groups of small diameter pins or rollers in rolling engagement with the inner surface of the tubular portion of the shaft 9 and with the outer surface of the shaft 6. The pins or rollers of the bearing 12 are held endwise between annular shoulders 16 on the shaft 6, and the pins or rollers of the bearing 14 are held endwise between a shoulder 17 in the shaft 9 and a shoulder 18 on the shaft 6.

The bearing 14 is disposed within an external bearing 20 which, in turn, supports the shaft 9 on the rear wall of the transmission case. The bearing 20 is, in turn, supported by a bearing cap 21 which fits in an opening in the wall 8 and is bolted to this wall at 22. The rearward end of the shaft 9 is splined at 23 and provided with a threaded stud extension 24 for connection to the forward end of the propeller shaft by means of the usual universal joint, or otherwise as suitable or desired. A worm gear 25 housed within the cap 21 and secured to turn with the shaft 9 by means of the splines 23 meshes with a worm wheel 26 for driving the speedometer mechanism of the vehicle in the usual manner. The rearward end of the cap 21 is preferably provided with fluid-tight oil closure means 27 for sealing the end of the case against the escape of lubricant which is maintained at the desired level within the case. The oil closure means cooperates to this end with the means for connecting the splined end of the shaft 9 to the propeller shaft.

The outer race of the bearing 20 seats against a shoulder 28 within the cap 21, and the inner race of this bearing is held between a shoulder 29 on the shaft 9 and a thrust washer 30.

At the forward end of the transmission, the shaft 6 is supported in a bearing 31 disposed in an opening in the front wall 7. The internal gear 32 is splined at 33 upon the shaft 6 adjacent the inner side of the wall 7. A washer or retainer ring 34, which may be in the form of a snap ring, is engaged in grooves 35 across the splines 33 and acts as a stop for limiting endwise movement of the gear 32 rearwardly on the shaft 6. This gear 32 has pressed fit on the splines 33, and the inner race of the bearing 31 abuts the forward end of the hub of the gear 32 and is, in turn, confined by a retainer ring 36. The pressed fit of the gear 32 on the splines 33 provides perfect alignment for the internal gear teeth, and with the bearing arrangement at 31 and the bearings back at 14 and 20, provides an admirable support for the parts in which quietness and a perfect pitch line circle are obtained.

The internal gear 32 has internal helical teeth 38 which mesh with external helical teeth 39 on an external internal or composite gear ring 40, the opposite end of which is provided with internal helical teeth 41. The external internal gear ring 40 is supported in a bearing 42 mounted eccentrically with respect to the axis of the shaft 6 in a retainer 43 formed integral with the case 5. The outer race of the bearing 42 is held against endwise movement to the right, Figure 1, by a retainer ring 45.

It is desirable, from the standpoint of quantity production and maximum quietness of gear operation, to make the internal teeth 38 and the cooperating external teeth 39 helical, and, in fact, all of the gears in the present transmissions, except the low ratio and reverse gears, are preferably helical gears. Straight teeth are, however, contemplated within the scope of the present invention.

The internal helical teeth 41 on the composite gear 40 mesh with external helical teeth 48 on a tubular overdrive driven member 49. This member 49 is mounted within the composite gear 40 and bearing 42 on needle-point bearings 50 on the driving shaft 6. The needle-point bearings 50 comprise two groups of small diameter pins or rollers separated endwise by an external annular rib 51 on the shaft 6 and held endwise between this rib and shoulders 52 and 53 on the shaft 6.

The driven member 55, for direct drive, is splined at 56 on the shaft 6 and is held against endwise movement to the right (Figure 1) by means of a retainer ring 57. A thrust washer 58 is interposed between the opposite end of the hub of the driven member 55 and the adjacent end of the overdrive driven member 49 to take the thrust developed between these parts by the helical gear teeth. The washer 58 is placed at this location so that it will have a low relative sliding speed, as, for instance, if the internal gear has thirty-two teeth and the meshing spur gear has twenty-eight teeth, it is obvious that the unit will make seven complete revolutions before this washer gains one complete revolution on its sliding thrust face, i. e. this washer turns in accordance with the tooth difference. Interposed between the radially extending portion at the right-hand end of the member 49 and the adjacent end of the external internal gear member 40 is a thrust washer 60.

The driven member 55, for direct drive, is provided peripherally with external clutch teeth 61 for engagement with internal clutch teeth 62 at the left-hand end (Figure 1) of the synchronizing and clutching ring 63 when this ring is shifted to the right from neutral position as shown in Figure 1. These same teeth 62 are adapted to be engaged, when the ring 63 is shifted to the left, with external clutch teeth 64 peripherally about the radially extending portion of the overdrive driven member 49.

The low ratio gear 10 formed integral with the shaft 9 has external teeth 66 and internal splines 68 which are in permanent and slidable driving engagement with external splines 69 on the adjacent end of the synchronizing and clutching ring 63. A thrust washer 70 is preferably interposed between the ring 57 and the adjacent portion of the gear 10.

The splines 69 are slidable with respect to the splines 68 in shifting the member 63, and this slidable splined engagement is of sufficient length for constant engagement when the ring 63 is in neutral position as shown in Figure 1, as well as when this ring is shifted to engage the teeth 62 with the teeth 61 as shown in Figure 4, and when said ring 63 is shifted in the opposite direction to engage the teeth 62 with the teeth 64 as shown in Figure 3. The right-hand end of the ring 63 (Figure 1) telescopes over the teeth 61 which, with the telescoping relation of the splined portions of the gear 10 and ring 63, makes for exceedingly compact endwise relation of these parts.

The synchronizing means comprises a synchronizing ring member 72 having internal oppositely tapered or oppositely conical surfaces 73 and 74 for frictional engagement with corresponding tapered surfaces 75 and 76 on the overdrive driven member 49 and direct drive driven member 55, respectively. The synchronizing ring 72 may be made in the form of a bronze casting or the like, and this ring has splined driving connection with the ring 63 by means of external splines or teeth 78 which engage with the internal teeth 62 of the ring 63. A coiled garter spring 80 yieldingly connects the synchronizing ring 72 to the clutching ring 63 so that the ring 72 will move yieldingly with the ring 63 and, after the two parts 63, 49 or 63, 55 are synchronized by engagement of the cone clutch surfaces 73, 75 or 74, 76, permits the ring 63 to move on past the ring 72 for engagement of the clutch teeth 62 with the clutch teeth 61 for direct drive, or engagement of the clutch teeth 62 with the clutch teeth 64 for internal gear overdrive. In the neutral position of the ring 72, as shown in Figure 1, there may be a slight clearance between the cone clutch surfaces 73, 75 and 74, 76.

The garter spring 80 is preferably made of spring wire of square section with the sides flared inwardly slightly, as shown in Figure 7, so that as the wire is wound to the desired form, the stretch along the outer periphery of the convolutions thereof will bring the section of the wire to substantially square or rectangular form as shown in Figure 8. The turns of this spring are preferably wound close together, one against the other, and the ends of the garter spring 80 thus produced are suitably joined together. This spring 80 encircles the synchronizing ring 72 and lies in an annular groove 82 formed about the teeth 78. The sides of this groove 82 flare outwardly and the ring 63 has an internal groove 83 which registers with the groove 82 and is adapted to receive the outer portion of the garter spring 80 which yieldingly connects the two rings.

As the synchronizing ring 72 is engaged, for example, with the conical surface of the member 55 in the movement of the ring 63 to the right (Figure 1), continued movement of the member 63 in this direction will cause the right-hand side of the groove 82 to expand the garter spring 80 outwardly into the groove 83 and from the groove 82 so that the member 63 may continue its movement to engage the clutch teeth 62 with the clutch teeth 61 without further movement of the synchronizing ring 72. In shifting into internal gear overdrive, the action of the garter spring 80 against the left-hand side of the groove 82 is the same. Figure 3 shows the position of the parts after the ring 63 has been synchronized with the overdrive driven member 49 and the clutch teeth 62 engaged with the clutch teeth 64, whereas Figure 4 shows the position of the parts after the ring 63 has been synchronized with the direct drive driven member 55 and the clutch teeth 62 moved into engagement with the clutch teeth 61.

Figure 10:
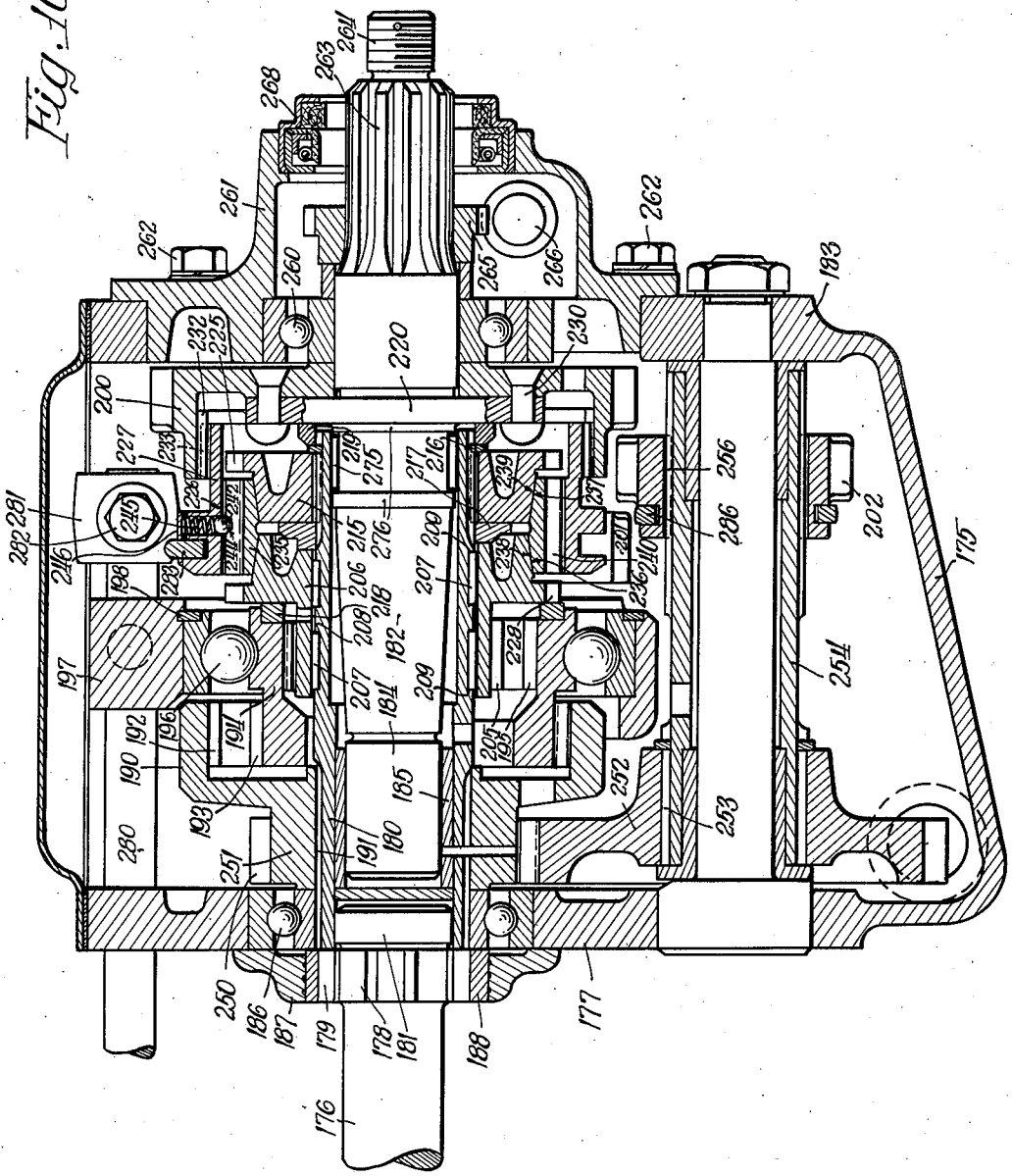
Figure 10 is a longitudinal sectional view of another form of transmission embodying the present invention.

The ring member 63 may be shifted by the regular shifter bars which may be operated from the same shift lever which operates the other gears—for example, in the manner shown in connection with the embodiment of Figures 10 to 12, inclusive, or the overdrive may be operated separately as for an automatically shiftable transmission if such is desired. The ring 63 is provided with a groove 85 for receiving a cooperating portion on the shifter arm (not shown).

The second ratio external gear 88, the teeth of which are preferably of helical form, is rotatably mounted on the tubular portion of the shaft 9 adjacent the side of the gear 10 opposite the side having splined engagement with the ring 63. A bushing 89' may be provided between this gear 88 and the adjacent portion of the shaft 9. This second ratio gear 88 has permanent driving engagement with the external helical teeth of a gear 89 splined upon the countershaft 90. The low ratio gear 10 and the second ratio gear 88 are fixed endwise on the main shaft instead of being slidable, thereby lessening the space required for these gears.

The countershaft 90 is shown of tubular form, but it is to be understood that this shaft need not be tubular and may be otherwise varied within the scope of the present invention. In the illustrated embodiment of the invention, the opposite ends of the tubular countershaft or lay shaft 90 are rotatably supported upon bearing or bushing members 91 and 92, and a pin 93 extends through the shaft 90, the members 91 and 92, and the end walls 7 and 8 of the case 5, and is secured against endwise displacement by a head 94 formed on one end of the pin and engaging in a suitable opening in the end wall 7 and a nut 95 threaded upon the opposite end of the pin into cooperation with the end wall 8.

The internal gear 32 has external helical teeth 98 formed integral with its hub 99. These teeth 98 have permanent driving engagement with the external helical teeth of a gear 100 rigidly splined at 102 on the countershaft 90. Gear 104 is splined at 105 for shifting movement on the countershaft 90 and is adapted to be meshed selectively with the external teeth 66 of the low ratio gear 10 for low ratio drive, or with the external teeth of a gear 106 mounted on a countershaft 107 or lay shaft for reverse drive. The external teeth of the gears 10, 104 and 106 are preferably straight teeth to enable movement of the gear 104 into and out of mesh with the gears 10 and 106. The gear 104 has a groove 110 for cooperation with the shifter arm of one of the shifter bars in the manner shown, for example, in the embodiment of Figures 10 to 12, inclusive, or this gear may be shifted in any other suitable or preferred manner.

Rearwardly of its external teeth, the gear 88 has integral clutch teeth 115, and rearwardly of these teeth 115 is a synchronizing sleeve 116 riveted by rivets 117 upon the tubular rearward end of the gear 88. The sleeve 116 may be formed of cast bronze or other suitable material, and this sleeve has an external conical friction clutch or synchronizing surface 118 for synchronizing engagement with an internal conical friction clutch or synchronizing surface 119 of a synchronizing ring 120 for second ratio drive. The ring 120 is splined at 121 for shifting movement upon the driven shaft 9, and has external teeth 122 in permanent sliding engagement with the internal clutch teeth 123 of the outer positive clutching ring 124.

The ring 124 has a groove 126 whereby it may be shifted by one of the shifting bars, such as shown in the embodiment of Figures 10 to 12, inclusive, or it may be otherwise operated from the same shift lever which operates the other gears, or otherwise as desired.

The ball members 128, a number of which are spaced circumferentially about the ring 124, are pressed yieldingly into engagement with notches 129 in teeth 123 by coiled springs 130. The ball members 128 and springs 130 are disposed to operate in radial sockets in the synchronizing ring 120. The right-hand ends at least (Figure 1) of the notches 129 are spread or diverge downwardly so that as the synchronizing ring is engaged, for example, with the conical surface of the sleeve 116 in the movement of the ring 124 to the left, continued movement of the ring 124 in this direction will cause the right-hand ends of the notches 129 to cam the ball members inwardly into position where they are released from the notches 129 so that the member 124 may continue its movement to engage the internal clutch teeth 123 with the clutch teeth 115 for second ratio drive.

It is believed that the operation of the device will be apparent from the foregoing description. With the parts in the positions shown in Figure 1, the transmission is in neutral. In order to obtain low ratio drive, the gear 104 is shifted rearwardly into meshing engagement with the low ratio gear 10. The drive is then transmitted from the driving shaft 6 through the meshing gears 98 and 100, countershaft 90, and meshing gears 104 and 10, to drive the driven shaft 9 at low speed. Second ratio is obtained by shifting the ring 124 forwardly, the friction surfaces first synchronizing the ring 124 with respect to the second ratio gear 88, whereupon the internal clutch teeth 123 move into positive clutching engagement with the teeth 115. Second ratio drive is then transmitted from the driving shaft 6 through the meshing gears 98 and 100, countershaft 90, and meshing gears 89 and 88, to the driven shaft 9. A buffer ring 135 may be provided for limiting movement of the ring 124 to the left (Figure 1).

In order to obtain direct drive, the clutching ring 63 is shifted rearwardly, the cooperating friction surfaces first synchronizing the ring 63 with respect to the direct drive driven member 55, whereupon the internal clutch teeth 62 are moved into positive clutching engagement with the clutch teeth 61. Direct drive is then transmitted from the driving shaft 6 through the direct drive driven member 55, clutching ring 63, and gear 10, to the driven shaft 9. Internal gear overdrive is obtained by shifting the ring 63 forwardly from the position shown, the cooperating friction surfaces first synchronizing this ring with respect to the overdrive driven member 49, whereupon the internal clutch teeth 62 are positively engaged with the clutch teeth 64. Internal gear overdrive is then transmitted from the driving shaft 6 through the internal gear 32 and the meshing external teeth of the composite gear 40, and thence through the internal teeth of the composite gear and the meshing external teeth of the overdrive driven member 49 to the clutching ring 63 and through the low ratio gear 10 to the driven shaft 9.

The transmission case 5 may be provided with a suitable cover, and suitable provision may be made for lubricating the gears contained within the case 5 as, for example, by means of an opening at the top of the case, and a drain plug may be provided at the bottom as shown at 136.

The embodiment of the invention shown in Figure 9 is substantially like the preceding embodiment except that, instead of providing only for low ratio speed, second ratio speed, direct drive and overdrive, this embodiment is a five-speed transmission having low, second and third speed ratios, direct drive and overdrive.

Insofar as the transmission of Figure 9 is like the preceding embodiment of the invention, primed reference characters, similar to the reference characters used in connection with the preceding embodiment, are employed. The description of these parts will not be repeated, but reference is directed to the foregoing description for an understanding of the present embodiment of the invention so far as it is similar to the preceding embodiment.

In this embodiment of the invention, the gear 88' on the driven shaft 9' constitutes the second ratio gear. Another gear 140 rotatable on the tubular portion of the driven shaft 9' constitutes a third ratio or third speed gear. This gear 140 has permanent driving engagement with a gear 142 rigidly splined at 143 on the countershaft 90'. A suitable bushing 144 is interposed between the gear 140 and the shaft 9'.

Forwardly of its external gear teeth the gear 140 has integral clutch teeth 145, and forwardly of these teeth 145 is a synchronizing sleeve 146 riveted by rivets 147 upon the tubular forward end of the gear 140. The sleeve 146 may be formed of cast bronze or other suitable material and has an external friction clutch or synchronizing surface 148 conical or tapered oppositely to the surface 118' for synchronizing engagement with an internal friction clutch or synchronizing surface 149 of the synchronizing ring 120'. The ring 120' is splined at 121' for shifting movement upon the driven shaft 9', and suitable thrust washers 152 and 153 are interposed between the opposite ends of the splined portion 121' of the shaft 9' and the bushings 89' and 144 respectively.

The ball members 128', a number of which are spaced circumferentially about the ring 120', are pressed yieldingly into engagement with notches 129' in teeth 123' by coiled springs 130'. The ball members 128' and springs 130' are disposed for operation in radial pockets in the ring member 120'. The ends of the notches 129' are spread or diverge inwardly so that as the synchronizing ring 120' is engaged, for example, with the conical surface of the member 88' in the movement of the ring 124' to the left (Figure 9), continued movement of the ring 124' in this direction will cause the right-hand ends of the notches 129' to cam the ball members 128' inwardly into position where they are released from the notches 129' so that the clutching ring 124' may continue its movement to engage the clutch teeth 123' with the clutch teeth 115'. In shifting into third speed, the action of the ball members 128' with the left-hand ends of the notches 129' is the same, so that the ring 124' may continue its movement to the right (Figure 9) after synchronizing the ring 124' with the gear 140 to engage the clutch teeth 123' with the clutch teeth 145.

The ring 124' may be shifted by the regular shifting bars which may be operated from the same shift lever which operates the other gears or, as in the preceding embodiment, the overdrive may be operated separately, as for an automatically shiftable transmission, if such is desired. For shifting purposes, the ring 124' is provided with the external groove 126'.

Low speed drive, second speed drive, direct drive and overdrive are obtained in this embodiment in substantially the same manner as in the preceding embodiment. To obtain third speed, the clutching ring 124' is shifted to the right, the cooperating friction surfaces 148, 149 first synchronizing the ring 124' with respect to the gear 140, whereupon the movement of the ring 124' is continued to engage the clutch teeth 123' with the clutch teeth 145 to connect the gear 140 to the driven shaft 9'. Third speed drive is then obtained from the driving shaft 6' through the meshing gears 98' and 100', countershaft 90', and meshing gears 142 and 140, to the driven shaft 9'.

As in the preceding embodiment, all of the gears except the shiftable gear 104' and the low speed gear 10' and reverse gear 106', which cooperate therewith, have helical teeth, the gears 104', 10' and 106' having straight teeth to permit moving the gear 104' into and out of engagement with the gears 10' and 106'. Any or all of the other gears may, however, have straight teeth within the scope of the present invention.

The embodiment of Figure 9, like the embodiment of Figures 1 to 8, lends itself to a very strong and rigid main shaft arrangement which holds the parts on their proper pitch lines under heavy loads. The needle-point bearing members 12' are held against endwise displacement by shoulders 160 formed internally of the tubular portion of the driven shaft 9'.

The transmission shown in Figures 10 and 11 is a three-speed and reverse transmission embodying the present invention. It has a geared low ratio drive, a geared reverse drive, a direct second speed drive, and an internal gear drive for third speed which is an overdrive. This transmission is similar to the transmissions illustrated and described in my copending application Serial No. 10,769, filed March 13, 1935, except that it has the geared low ratio drive and reverse drive directly in combination with the direct drive and overdrive.

In this case, the entire transmission is housed within the case 175 which, as before, is preferably mounted upon the vehicle frame, which frame is, in turn, preferably spring-supported upon the rear axle as, for example, in the manner illustrated in my copending application above identified.

The shaft 176 is the driving shaft extending from the flywheel clutch bearing. This shaft extends into proximity to the front wall 177 of the case 175 and has ribs or splines 178 which engage with slots or splines 179 at the forward end of the tubular driving member 180, and drivingly connect the shaft 176 to the tubular member 180. The shaft 176 terminates a short distance rearwardly of the driving connection 178, 179, and is piloted at 181 in the adjacent end of the member 180.

The driven shaft 182, which is coaxial with the shaft 176 and tubular driving member 180, extends through the rear wall 183 of the case 175 and over into proximity to the forward end of the transmission case where it telescopes into and is piloted at 184 in the tubular portion 180 of the driving shaft. A suitable bushing may be provided at 185 between the forward end of the shaft 182 and the tubular driving member 180.

The forward end of the tubular member 180 is supported in a bearing 186 which is held in the opening in the front wall 177 by a retainer 187. The retainer 187 has a grooved inner periphery in oil sealing cooperation with a separate ring 188.

An internal gear 190 is splined at 191 upon the member 180. This gear 190 has internal helical teeth 192 which mesh with external helical teeth 193 on the external internal or composite gear ring 194, the opposite end of which is provided with internal helical teeth 195. The external internal gear ring 194 is supported eccentrically with respect to the common axis of the shaft 176, 182 in a bearing 196 mounted in a suitable bearing retainer portion 197 which may be formed integral with the case 175. The outer race of the bearing 196 is held against endwise movement to the right (Figure 10) by a retainer ring 198. The inner race of the bearing 186 abuts the forward end of the hub of the gear 190 and, as explained, is, in turn, confined by the retainer 187. As in the preceding embodiments of the invention, helical teeth are preferably employed throughout except on the low ratio gear 200 and on the reverse gear 201 and shiftable gear 202. Straight teeth are, however, contemplated as and where desired, as in the preceding embodiments.

The internal helical teeth 195 on the combination external internal or ring gear 194 mesh with external helical teeth 205 on the overdrive driven member 206. This member 206 is preferably mounted by means of needle-point bearings 207 on the tubular driving member 180. The small diameter pins constituting the bearings 207 are separated endwise by an external annular rib 208 on the tubular member 180, and are held endwise between this rib and shoulders 209 on the member 180. The inner periphery of the member 206 bears upon the small diameter pins 207 and one of these groups of pins is arranged internally of the bearing 196, whereas the other group is arranged internally of the clutching and synchronizing portions at the rear end of the member 206.

The driven member 215, for direct drive, is splined on the tubular driving member 180 and is held against endwise movement to the right (Figure 10) by means of a retainer ring 216. A thrust washer 217 is interposed between the forward end of the direct drive member 215 and the rearward end of the overdrive member 206. Interposed between the member 206 and the rearward end of the composite gear 194 is a thrust washer 218, and another thrust washer 219 may be interposed between the retainer ring 216 and the flange 220 which is formed integral with the driven shaft 182.

The direct drive member 215 is provided peripherally with external clutch teeth 225 for engagement with the internal clutch teeth 226 at the left-hand end (Figure 10) of the clutching ring 227 when this ring is shifted to the right from neutral position as shown. These same teeth 226 are adapted to be engaged, when the ring 227 is shifted to the left, with external clutch teeth 228 peripherally about the radially extending portion of the overdrive member 206.

The low ratio gear 200 is formed in a separate piece riveted at 230 to the flange 220 on the driven shaft 182. In addition to the external teeth, this gear 200 has internal splines 232 which are in permanent and slidable driving engagement with external splines 233 on the adjacent end of the clutching ring 227. The splines 233 are slidable with respect to the splines 232 in shifting the member 227, and this slidable splined engagement is of sufficient length for constant driving engagement between the member 227 and the gear 200 when the member 227 is in neutral position as shown in Figure 10, as well as when this member is shifted to engage the teeth 226 with the teeth 225, and when said member 227 is shifted in the opposite direction to engage the teeth 226 with the teeth 228.

The means for synchronizing the member 227 with the members 206 and 215 is similar to the means shown in my copending application above identified. This means comprising a synchronizing ring 235 having internal oppositely tapered surfaces 236 and 237 for frictional engagement with correspondingly inclined surfaces 238 and 239 on the overdrive member 206 and direct drive member 215, respectively. The ring 235 may be made in the form of a bronze casting or the like, and this ring has splined driving connection with the clutching ring 227 by means of external clutch teeth 240 which engage with the internal clutch teeth 226 of the member 227. The spring-pressed ball members 242 move the ring 235 yieldingly with the ring 227, and after the two parts 227, 206 or 227, 215 are synchronized by the engagement of the cone clutch surfaces 236, 238 or 237, 239, permits the ring 227 to move on past the ring 235 for engagement of the clutch teeth 226 with the clutch teeth 225 for direct drive, or engagement of the clutch teeth 226 with the clutch teeth 228 for internal gear overdrive. In the neutral position of the ring 235, as shown in Figure 10 there is preferably a slight clearance between the cone clutch surfaces 236, 238 and 237, 239.

The ball members 242, a number of which are spaced circumferentially about the ring 227, are pressed yieldingly into engagement with notches 244 in teeth 240 by coiled springs 245. The ball members 242 operate in radial openings which extend through the ring 227 and the springs 245 are held in place by cap members 246. The ends of the notches 244, as viewed in Figure 10, are spread or diverge outwardly so that as the synchronizing ring is engaged, for example, with the conical surface of the member 215, continued movement of the member 227 to the right will cause the right-hand ends of the notches 244 to cam the ball members 242 outwardly into position where they are released from the notches 244 so that the member 227 may continue its movement to engage the teeth 226 with the teeth 225. In shifting into internal gear overdrive, the action of the ball members with the left-hand ends of the notches 244 is the same.

The internal gear 190 has external helical teeth 250 formed integral with its hub 251. These teeth 250 have permanent driving engagement with the external helical teeth of a gear 252 rigidly splined at 253 on the countershaft 254. Gear 202 is splined at 256 for shifting movement on the countershaft 254 and is adapted to be meshed selectively with the external teeth of the low ratio gear 200 for low ratio drive, or with the external teeth of the gear 201 mounted on a countershaft for reverse drive.

The driven shaft 182 is supported at the rear end of the transmission case in a bearing 260, which bearing is, in turn, supported by a bearing cap 261 which fits in an opening in the rear wall 183 and is bolted to this wall at 262. The rearward end of the shaft 182 is splined at 263 and provided with a threaded stud extension 264 for connection to the forward end of the propeller shaft by means of the usual universal joint or otherwise as suitable or desired. As in the preceding embodiments, a worm gear 265, housed within the cap 261 and secured to turn with the shaft 182 by means of the splines 263, meshes with a worm wheel 266 for driving the speedometer mechanism or other mechanism of the vehicle. Also, as in the preceding embodiments, the rearward end of the cap 261 is preferably provided with a fluid-tight oil closure means 268 for sealing the end of the case 175 against the escape of lubricant which is maintained at the desired level within the case.

Forwardly of the flange 220, needle-point bearings 275 are provided between the shaft 182 and the rearward end of the tubular driving member 180. These needle-point bearings 275 are held endwise between annular shoulders 276 on the shaft 182.

The ring member 227 and gear 202 are shifted in any suitable or desired manner as by means of axially slidable shifter rods 280, one for the member 227 and the other for the gear 202. One rod 280 has a shifter arm 281 secured thereto at 282, and this shifter arm has suitable shifting engagement or cooperation at 283 with an external groove in the member 227, whereby movement of the rod 280 to the right (Figure 10) shifts the member 227 to the right, and movement of the rod in the opposite direction shifts the member 227 in the opposite direction. The other rod 280 (Figure 12) has suitable shifting engagement or cooperation at 286 with an external groove in the gear 202, whereby movement of this latter rod in one direction shifts the gear 202 into engagement with the low ratio gear 200. Movement of this latter rod 280 in the opposite direction shifts the gear 202 into engagement with the reverse gear 201. The gear 202 is shown (Figure 10) in neutral position, and with this gear in this position, direct drive and overdrive may be obtained by shifting the clutching member 227 in the desired direction.

The outer ends of the rods 280 are provided with shifter jaws 290 with which the lower end 291 of a rocker lever 292 is selectively engaged for shifting the rods 280 as desired. The rocker lever 292 is incorporated to provide a standard H shift for low, second, high and reverse. This lever 292 is pivoted intermediate its ends upon a transverse pin 293, and its upper end has a socket 294 for engagement with a ball-like head 295 at the lower end of the shift lever 296. The pin 293 is carried by a bracket 298 having a pin 299 which is journaled to turn about an axis at right angles to the axis of the pin 293 as, for example, in the rearward end of the clutch housing 300.

The shift lever 296 is mounted in the usual hollow pedestal or conning tower 302 through a universal ball and socket mounting at 304. A coiled spring 305, surrounding the lever 296 and disposed between a collar 306 and the ball forming part 307 of the mounting at 304 holds the ball part yieldingly in cooperation with its socket and the ball-like head 295 at the lower end of the lever 292 yieldingly in the socket 294.

It is believed that the operation of the device will be apparent from the foregoing description. With the parts in the positions shown, the transmission is in neutral. By swinging the lever 296 laterally, the rocker lever 292 is rocked about the axis of the pin 299 to engage the lower end 291 with the jaw 290 on the rod 280 which carries the shifter arm 281, or with the jaw on the other rod for the shiftable gear 202. With the lower end of the rocker lever 292 engaged with the jaw on the rod 280 which carries the shifter arm 281, forward swinging movement of the lever 296 will shift the rod 280 to the right (Figure 10) and will, after synchronizing the member 227 with respect to the direct drive member 215, engage the clutch teeth 226 with the clutch teeth 225 for direct drive. Rearward swinging movement of the upper end of the shift lever 296 with the lower end of the rocker lever 292 engaged with the jaw on this rod 280 will shift the member 227 forwardly (Figure 10). This forward movement of the member 227, after first synchronizing this member with respect to the overdrive member 206, engages the clutch teeth 226 with the clutch teeth 228 for internal gear overdrive.

Low ratio and reverse drives are obtained by shifting the rod carrying the arm 281 to neutral position, whereupon the lever 296 is swung laterally to engage the lower end of the rocker lever 292 with the jaw 290 on the rod for the shiftable gear 202. With the lower end of the lever 292 engaged with this jaw member, low speed is obtained by swinging the upper end of the shift lever 296 forwardly. This shifts the rod 280 with which the lower end of the lever 292 is engaged to the right (Figure 10) and, through the shifter connection at 286, shifts the gear 202 into engagement with the low speed gear 200. Low ratio drive is then transmitted from the shaft 176 through the gears 250 and 252, countershaft 254, and gears 202 and 200, to the driven shaft 182. With the lower end of the rocker lever 292 engaged with the jaw member on this rod 280, rearward swinging of the upper end of the shift lever 296 shifts this rod 280 forwardly which shifts the gear 202 out of engagement with the low ratio gear 200 and into neutral position as shown (Figure 10), or forwardly into engagement with the reverse gear 201 for transmitting reverse drive to the driven shaft from the shaft 176. This reverse drive is transmitted through the gears 250 and 252 to the countershaft 254, and through the gears 202 and 201, the countershaft for the gear 201, and through a second gear on this countershaft which meshes with the gear 200 as in the embodiment of Figures 1 to 8.

In the embodiment of the invention illustrated in Figures 13 and 14, the tubular driving member 320 is mounted at one end on an internal bearing 321 and in an adjacent external bearing 322. This tubular driving member passes through the internal gear members 323, through the external internal or composite gear 324, overdrive driven member 325 and direct drive member 326, and is mounted beyond the direct drive member 326 in an external bearing 328.

The driven shaft 330, which is coaxial with the tubular driving member 320, extends telescopically through the member 320, and is piloted at its forward end in the bearing 321. A nut 332, threaded upon the forward end of the shaft 320, holds the same in place in the bearing 321. The shaft 330 is provided adjacent the bearing 328 with an integral flange 334, and on the side of this flange opposite the side on which the bearing 328 is disposed is mounted in a bearing 335, which bearing 335 is mounted in a suitable retainer 336. The outer race of the bearing 335 is held against endwise movement to the left (Figure 13) by a retainer ring 337, and the inner race is clamped against the shoulder 338 on the shaft 330 by a nut 339 threaded upon the shaft 330 at 340.

The forward end of the tubular driving member 320, as viewed in Figure 13, has an integral flange 342, and a suitable driving member 343 is bolted at 344 to this flange. The driving member 343, which may be any suitable or preferred driving member, has the internal gear part 323 provided with internal helical teeth 347 which mesh constantly with external helical teeth 348 on the composite gear 324. In the illustrated embodiment of the invention, the driving member 343 has integral bevel gear teeth at 350 for an angular driving arrangement such as shown, for example, in my copending application Serial No. 10,769, filed March 13, 1935, but this may vary widely within the scope of the present invention. Externally of the internal gear teeth 347 and the meshing external teeth 348 of the composite gear, the internal gear portion of the driving member 343 is mounted in a roller bearing 352. A thrust washer 354 is preferably interposed between the outer race of the bearing 352 and the bearing retainer 356.

The composite gear 324 is journaled in proximity to the rearward ends of the external teeth 348 in a roller bearing 358 and, externally of the internal teeth 359, the composite gear is journaled in a radial thrust bearing 360. The bearing 360 is mounted in the bearing retainer 356. The outer race of this bearing 360 is held against endwise movement to the right (Figure 13) by a retainer ring 362, and the inner race is held between a shoulder 363 at the rearward end of the composite gear 324 and a retainer ring 365.

The internal helical teeth 359 on the composite gear 324 mesh with external helical teeth 367 on the tubular overdrive member 325. This member 325 is mounted within the composite gear 324 on needle-point bearings 364. The needle-point bearings 364 comprise two groups of small diameter pins or rollers separated endwise by an external annular rib 365 on the member 320 and held endwise between this rib and shoulders 366 on this member. The forward end of the tubular portion of the overdrive member 325 abuts the adjacent race of the bearing 322, and a thrust washer 368 is interposed between the opposite end of the member 325 and the direct drive member 326.

The direct drive member 326 is splined at 370 upon the tubular driving member 320, and is held against endwise movement to the right (Figure 13) by means of a retainer ring 372. The direct drive member 326 is provided peripherally with external clutch teeth 374 for engagement with internal clutch teeth 375 on the clutching ring 376. Forwardly of the external clutch teeth 374, the direct drive member 326 is provided with a synchronizing sleeve 378 riveted by rivets 379 upon the direct drive member 326. The sleeve 378 may be formed of cast bronze or other suitable material, and has an external frictional clutch or synchronizing surface 380 for synchronizing engagement with an internal friction clutch or synchronizing surface 381 on the synchronizing ring 382.

The synchronizing ring 382 has an oppositely conical synchronizing surface 383 for synchronizing engagement with an external friction clutch or synchronizing surface 384 on a synchronizing ring 385 riveted by rivets 386 upon the overdrive member 325. This member 325 has a radially extending portion provided peripherally with clutch teeth 390 for engagement with internal clutch teeth 391 on the clutching ring 376 when this ring is shifted to the left from the position shown in Figure 13.

Secured, as by means of rivets 400, to the double-cone synchronizing member 382 is a ring 401 which is provided with a plurality of circumferentially spaced openings 402. The clutching ring 376 carries a plurality of studs 403 of hexagonal form, as shown in Figures 13 and 14. These studs are held in place in corresponding openings in the clutching ring 376 in any suitable manner, as by means of bolts 404 and a ring 405. The studs 403 project inwardly from the ring 376 and into the openings 402 in the ring 401.

The clutching ring 376 and synchronizing ring 382 are movable with respect to each other, but spring-pressed detent means is provided for causing the two parts to move together. Such detent means is disposed within the driving studs 403 and comprises a coiled spring 408 disposed in a recess 409 in the associated stud 403 and pressing a steel ball 410 into a groove 412 formed in the outer surface of the synchronizing member 382. The clutch ring 376 has limited rotative movement and is axially slidable on the part 401 for engaging the teeth 375 with the teeth 374 for direct drive, or the teeth 391 with the teeth 390 for internal gear overdrive.

The openings 402 in the ring 401 are specially formed as best shown in Figure 14. These openings are of approximately cruciform shape and are provided with generally semi-hexagonal intermediate recesses 420 and 421 and laterally disposed recesses 422 and 423 of similar form but somewhat longer. The associated stud 403 is adapted to be disposed in any one of these recesses in the operation of the transmission, as will be apparent from the following description.

The clutching ring has an external groove 430 for engagement with suitable shifter means (not shown), and at its right-hand end (Figure 13) the ring 376 has internal splines 432 which have permanent slidable driving engagement with splines 434 about the periphery of the flange 334. The splines 432 are sufficiently long to maintain the driving engagement with the flange 334 when the ring 376 is in neutral position as shown, as well as when this ring is shifted to engage the teeth 375 with the teeth 374 and when shifted to engage the teeth 391 with the teeth 390.

In operation, the initial movement of the ring 376, for example, to the left (Figure 13) carries with it, due to the engagement of the spring-pressed ball 410 in the groove 412, the double-cone synchronizing part 382. This causes the conical surface 383 to engage the conical surface 384 of the sleeve 385 and, as soon as this engagement is effected, the rotation of the overdrive member 325 drags with it the parts 382 and 401 until the stud 403 is engaged by the recess 421. As soon as this is accomplished, further shifting of the ring 376 to the left to engage the clutch teeth 391 with the clutch teeth 390 acts through the engagement of the stud 403 with the inclined surface at the left-hand side of the recess 421 to carry with it the parts 382 and 401. Thus, more forcible synchronizing engagement is obtained than if merely the spring-pressed ball 410 were relied upon to press the synchronizing surface 383 into engagement with the synchronizing surface 384.

The same action is provided when the ring 376 is shifted in the opposite direction to engage the internal clutch teeth 375 with the external clutch teeth 374 for direct drive. In other words, when the ring 376 is shifted in one direction the ball 410 falls into the groove 412, engaging the cone clutch which slides the hexagonal stud 403 into the position shown, or into the opposite position, according to the direction of movement. The synchronizing pressure is then accomplished by the angle of the sides of the recesses 420 or 421. When the parts are synchronized, the stud 403 slides off the inclined face of the recess 420 or 421, and the positive clutches 391, 390 or 375, 374 are engaged.

The eccentric bearing retainer 356 is formed for assembly of the unit in the same bore of the housing in which the synchronizing and positive clutches are mounted.

Internally of the bearing 328, needle-point bearings 460 are provided between the external surface of the driven shaft 330 and the internal surface of the tubular driving member 320. These needle-point bearings 460 are held against endwise displacement by annular shoulders 462 on the driven shaft 330.

It is to be understood that when the internal clutch teeth 391 of the clutching ring 376 are engaged with the external clutch teeth 390, internal gear overdrive is transmitted from the driving member 343 through the internal teeth 347 and meshing external teeth 348 of the composite gear 324, and from this gear through the meshing teeth 367, 359 to the overdrive driven member, and thence through the clutching ring 376 and engaging splines 432, 434 to the driven shaft 330. When the clutch teeth 375 are engaged with the clutch teeth 374, direct drive is transmitted from the driving member 343 through the tubular member 320, direct drive member 326, clutching ring 376 and splines 432, 434 to the driven shaft 330.

I have described the invention in connection with the details of particular embodiments, but I do not intend thereby to limit the invention to such details, nor do I intend to be limited to the particular embodiment and relation of the essential features shown and described.

I claim:

1. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear and extending through said internal gear, said composite gear and said first driven member, a second driven member fixed on the extending end of said driving member, a driven shaft, a low ratio spur gear on said driven shaft, a countershaft, an external gear section on said internal gear for driving the countershaft, a spline gear shiftably mounted on said countershaft and adapted to be engaged with said low ratio spur gear and to be disposed forwardly of the latter when disengaged therefrom, and a shiftable member disposed generally in the transverse plane of said spline gear in its disengaged position and having permanent slidable splined driving engagement with said low ratio gear for connecting said first and second driven members selectively to said driven shaft.

2. A gear set for motor vehicles having, in combination, an internal gear, a composite gear having internal teeth and external teeth meshing with the internal teeth of said internal gear, bearing means engaging the composite gear radially outwardly and substantially in the transverse plane of the internal teeth of said composite gear for supporting the latter with its axis in eccentric relation to said internal gear, a first driven member having external teeth meshing with the internal teeth on said composite gear, bearing means also in the plane of the internal teeth on said composite gear for taking the radial reaction of said meshing teeth and supporting said first driven member with its axis in eccentric relation to the internal teeth on said composite gear, a driving member fixed to said internal gear and having an extension extending through said internal gear, said composite gear and said first driven member, a bearing for said driving member, a second driven member fixed on the extending end of the extension of said driving member, a driven shaft coaxial with said driving member, said driven shaft and driving member being piloted one into the other, clutch teeth on said first driven member, clutch teeth on said second driven member, a low ratio spur gear fixed on said driven shaft and having internal splines, and a shiftable member having external splines in permanent slidable driving engagement with the internal splines on said low ratio spur gear, said shiftable member having clutch teeth for engagement with the clutch teeth on said first and second driven members for selectively connecting said driven members to said driven shaft.

3. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear and extending through said internal gear, said composite gear and said first driven member, a second driven member fixed on the extending end of said driving member, a driven shaft, a low ratio spur gear on said driven shaft, a shiftable member having permanent slidable splined driving engagement with said low ratio gear for connecting said first and second driven members selectively to said driven shaft, a countershaft, permanently meshing spur gears on said countershaft and said driving member, a reverse gear, and a spur gear shiftable on said countershaft selectively into and out of engagement with said reverse gear and said low ratio spur gear.

4. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear and extending through said internal gear, said composite gear and said first driven member, a second driven member fixed on the extending end of said driving member, a driven shaft, a low ratio spur gear fixed on said driven shaft, a second ratio spur gear loose on said driven shaft in juxtaposition with respect to said low ratio spur gear and on the rear side thereof, a counter shaft, a shiftable spline gear on the countershaft forwardly of said low ratio spur gear and adapted to be moved rearwardly into meshing engagement therewith, means for connecting said first and second driven members to said driven shaft, and means disposed rearwardly of said low ratio and second ratio spur gears for connecting said second ratio spur gear to said driven shaft.

5. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear and extending through said internal gear, said composite gear and said first driven member, a second driven member fixed on the extending end of said driving member, a driven shaft, a low ratio spur gear fixed on said driven shaft, a second ratio spur gear loose on said driven shaft, means for connecting said first and second driven members and said second ratio spur gear selectively to said driven shaft, a countershaft, constantly meshing gears on said driving member and said countershaft, a spur gear on said countershaft permanently meshing with the second ratio spur gear on said driven shaft, a reverse gear, and a spur gear shiftable on said countershaft selectively into and out of engagement with said reverse gear and said low ratio gear.

6. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear and extending through said internal gear, said composite gear and said first driven member, a second driven member fixed on the extending end of said driving member, a driven shaft, a low ratio spur gear fixed on said driven shaft, a second ratio spur gear loose on said driven shaft, a third ratio spur gear loose on said driven shaft, means for selectively connecting said first and second driven members and said second and third ratio spur gears to said driven shaft, a countershaft, permanently meshing gears on the driving member and said countershaft, gears on said countershaft permanently meshing with the second and third ratio spur gears on the driven shaft, a reverse gear, and a gear shiftable on the countershaft selectively into and out of engagement with said reverse gear and said low ratio gear.

7. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear and extending through said internal gear, said composite gear and said first driven member, a second driven member fixed on the extending end of said driving member, a driven shaft, a low ratio spur gear fixed on said driven shaft, a second ratio spur gear loose on said driven shaft rearwardly of said low ratio gear, a third ratio spur gear loose on said driven shaft, a shiftable member having permanent slidable splined driving engagement with said low ratio gear for connecting said first and second driven members selectively to said driven shaft, a second shiftable member drivingly connected to said driven shaft between said second and third ratio gears for selectively connecting the latter to said shaft, and means for synchronizing said first shiftable member with respect to said first and second driven members and said second shiftable member with respect to said second and third ratio spur gears.

8. In combination, a driving shaft, a driven shaft having a tubular portion telescoping over said driving shaft, a low ratio gear fixed thereon, an external bearing for said driven shaft, an internal bearing for the driving shaft disposed within the tubular portion of said driven shaft and adjacent said external bearing, a second ratio gear disposed for rotation on said driven shaft closely adjacent said internal and external bearings and spaced from said low ratio gear, radial thrusts on said second ratio gear being transmitted substantially directly to said external bearing, and a second bearing for said driving shaft disposed within the tubular portion of said driven shaft and in a position to receive directly the radial loads imposed on said low ratio gear and to transmit said radial loads through said driving shaft and the internal bearing therefor to said external bearing.

9. In combination, a driving shaft, a driven shaft having a tubular portion telescoping over said driving shaft, a low ratio gear fixed thereon, an external bearing for said driven shaft, an internal bearing for the driving shaft disposed within the tubular portion of said driven shaft and adjacent said external bearing, second and third ratio gears disposed for rotation on said driven shaft in spaced apart relation, one being arranged closely adjacent said low ratio gear and the other being disposed closely adjacent said internal and external bearings and spaced from said low ratio gear, radial thrusts on said other ratio gear being transmitted substantially directly to said external bearing, and a second bearing for said driving shaft disposed within the tubular portion of said driven shaft and in a position to receive directly the radial loads imposed on said one ratio gear and said low ratio gear.

10. In a transmission, a gear case, a driving shaft, a countershaft journaled for rotation in said gear case, a driven shaft extending through one end of said case and having a forwardly extending tubular portion, a low ratio gear formed integral with said tubular portion, a second ratio gear rotatable on the tubular portion of said shaft, and individual and selective means for driving said low ratio and second gears from said countershaft.

11. In a transmission, a gear case, a main driving shaft extending through one end of the case and into proximity to the other end of the case, said shaft having a splined portion within the case and adjacent one end thereof, an internal gear having pressed fit on the splined portion of said shaft, a shoulder forming a stop for the inner face of the internal gear, an outer bearing for the driving shaft, said bearing abutting the outer face of the internal gear, a driven shaft having a tubular portion telescoping said driving shaft, a low ratio gear fixed on said driven shaft, a bearing for said driven shaft adjacent the opposite end of the case, and bearings for said driving shaft disposed within the tubular portion of the driven shaft, one adjacent said last mentioned bearing and the other under the low ratio gear.

12. In combination, a driving shaft, an internal gear fixed to said shaft, a composite gear having internal teeth meshing with the internal teeth on said internal gear, a ratio drive member having external teeth meshing with the internal teeth on said composite gear, said driving shaft having an extension extending through said internal gear, said composite gear and said ratio drive member, a direct drive member fixed on the extending end of said shaft, a driven shaft coaxial with said driving shaft, means for connecting said ratio and direct drive members selectively to said driven shaft, a pair of ratio gears freely rotatable on said driven shaft, friction synchronizing and positive clutch means on each of said last gears, a shiftable synchronizing ring disposed between said last gears and having splined connection with the driven shaft, said synchronizing ring having synchronizing means for cooperation selectively with the synchronizing means on said last gears, and a shiftable clutch ring yieldingly connected to said synchronizing ring whereby said latter ring is shifted by said clutch ring, said clutch ring having positive clutch means for clutching engagement selectively with the positive clutch means on said last mentioned gears.

13. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear, a second driven member fixed on said driving member, a driven shaft, a low ratio spur gear fixed on said driven shaft, means for connecting said first and second driven members selectively to said driven shaft, a countershaft, constantly meshing gears on said driving member and said countershaft, a reverse gear, and a spur gear shiftable on said countershaft selectively into and out of engagement with said reverse gear and said low ratio gear.

14. A gear set for motor vehicles having, in combination, an internal gear, a composite gear having external teeth meshing with the internal teeth of said internal gear, a first driven member having external teeth meshing with the internal teeth of said composite gear, a driving member fixed to said internal gear, a second driven member fixed on said driving member, a driven shaft, a low ratio spur gear fixed on said driven shaft, a reverse idler gear disposed generally forwardly of said low ratio spur gear and driven therefrom, means for connecting said first and second driven members selectively to said driven shaft, a countershaft, constantly meshing gears on said driving member and said countershaft, and a spur gear disposed in a plane forward of said low ratio gear and rearwardly of the forward portion of said reverse idler gear, said last named spur gear being shiftable on said countershaft selectively into and out of engagement with said reverse gear and said low ratio gear.

THOMAS L. FAWICK.